Nov. 3, 1925.  
H. E. HARKIN  
1,560,053  
EGG MACHINERY AND PROCESS  
Filed Dec. 15, 1922  4 Sheets-Sheet 2

INVENTOR.  
HARRY E. HARKIN  
his ATTORNEY.

WITNESS

Nov. 3, 1925.

H. E. HARKIN 1,560,053

EGG MACHINERY AND PROCESS

Filed Dec. 15, 1922    4 Sheets-Sheet 3

INVENTOR.
HARRY E. HARKIN
BY *[signature]*
his ATTORNEY.

WITNESSES
*[signatures]*

Nov. 3, 1925.

H. E. HARKIN 1,560,053

EGG MACHINERY AND PROCESS

Filed Dec. 15, 1922   4 Sheets-Sheet 4

INVENTOR.
HARRY E. HARKIN
BY
his ATTORNEY.

WITNESSES:

Patented Nov. 3, 1925.

1,560,053

UNITED STATES PATENT OFFICE.

HARRY E. HARKIN, OF RIDGEFIELD PARK, NEW JERSEY, ASSIGNOR TO EGG MACHINERY COMPANY, INC., A CORPORATION OF NEW JERSEY.

EGG MACHINERY AND PROCESS.

Application filed December 15, 1922. Serial No. 607,192.

*To all whom it may concern:*

Be it known that I, HARRY E. HARKIN, a citizen of the United States, residing in the town of Ridgefield Park, county of Bergen, State of New Jersey, have invented certain new and useful Improvements in Egg Machinery and Processes, of which the following is a specification, reference being had to the accompanying drawings, illustrative of one particular embodiment of my invention.

This invention relates to methods and apparatus for separating the contents from the shells of eggs. The chief objects of the invention are to effect more complete and more sanitary separation of the contents from eggs, to effect this separation at great speed, to separate the entire contents from the shells or to separate the major values of the contents from each other and from the shells, to effect a substantially complete and highly efficient separation of the albumen from the yolk, and thereby make possible much greater egg value production from eggs.

With the greatly extended use of egg matter in these days of industrial food handling, transportation and preserving, the opening of the eggs for shipment of the contents has been done by hand with practically no suggestion of modification for efficiency or other advantages hereinafter cited, with the exception of hand operated breakers or a device for simulating hand manipulation.

This invention involves methods whereby eggs may be passed continuously, step by step with the progressive removal through apertures, of the albumen, and thereafter the yolk, and the segregating of the clean shell parts, or the progressive passing of an egg through steps which automatically open the egg and completely remove the contents and segregate the shells.

In order that the said invention may be clearly understood and readily carried into effect the same will now be described more fully with reference to the accompanying drawings illustrating one embodiment of a machine adapted to carry out the method and a diagrammatic illustration of the steps involved in the method:

Fig. 1 is a side elevation of the machine.

Fig. 1ᵃ is a fragmentary side elevation of a modified egg feed.

The feed device A delivers the eggs into the hopper B where the eggs are individually passed downward in the direction of their long axis and engaged by controlling rollers C at the time that they are passed between aperturing saws D, after which they drop into a cylinder E capable of being spun and which is surrounded by a container F. From the bottom of the cylinder the eggs are individually dropped by a trap G into cups H, on a conveyor J, which carry each egg after exit from the trap into operative relation with a decapitator K, while the conveyor upends each egg progressively to a position as L, and by suitable release mechanism M ejects the shell. The contents of the egg spilled out by inversion drops into the vessel N, and the shell parts are ejected or dropped into a container O and when the albumen is separately removed it flows from the jar E (surrounding the rotor) into the vessel P, Fig. 13.

The entire machine is driven by a small motor and suitable shafting leading to the various elements for the conveyor belts, the saw operation, the centrifugal cylindrical member or rotor the arrangement being such as to effect automatic actuation of the synchronized parts.

Figures 3, 4:
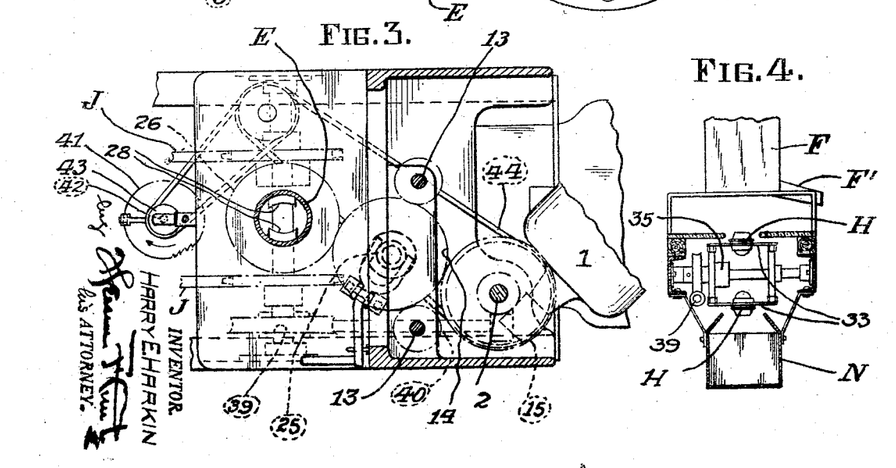
Fig. 3 is a horizontal section of the main driving mechanism on the line 3—3 of Fig. 6.
Fig. 4 is a section on the line 4—4, Fig. 1.
Figure 5:
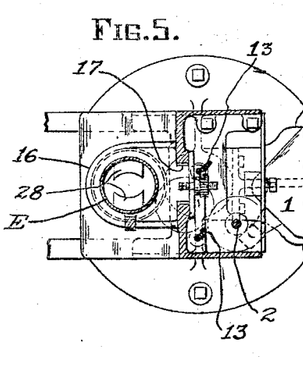
Fig. 5 is a plan view on the section line 5—5, Fig. 1.
Figures 6, 8, 9:
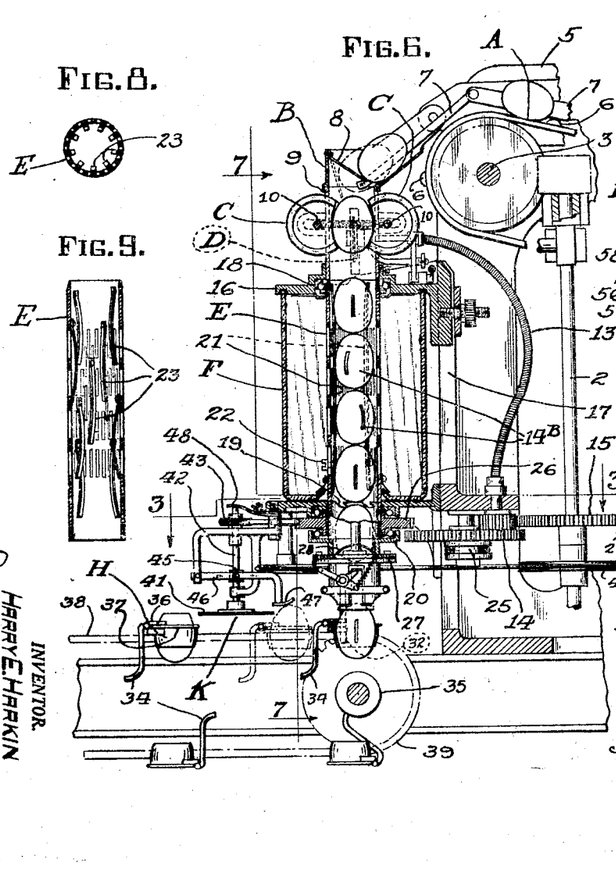
Fig. 6 is a vertical section on the axis of the main separating element referred to hereinafter as the rotor.
Figs. 8 and 9 are respectively a cross section and vertical section of the rotor.

Motor 1 drives the shaft 2 which drives the shaft 3 actuating the feed belt 4 to carry eggs from the supply box 5 by means of the cleats 6 into the guides 7 to the inclined drop into the hopper B where a safety member 8 assures a gentle delivery into the top of the feed cylinder 9. The controlling rollers C are each driven by shaft 10 from a shaft 11 and gears 12 on the main shaft 2. The saws D, disposed at right angles to the rollers C, are driven by flexible shafts 13 from the gear 14 when the gear 14 is in mesh with the main gear 15 on the shaft 2. In Figs. 6 and 3, gear 14 is shown out of mesh with the main drive to represent a condition where the rotor is stationary and the saws are not actuated, that is when the eggs are passed automatically by the trap into the conveyor for decapitation and the spilling of the entire contents mixed.

Figures 7, 10, 11, 12:
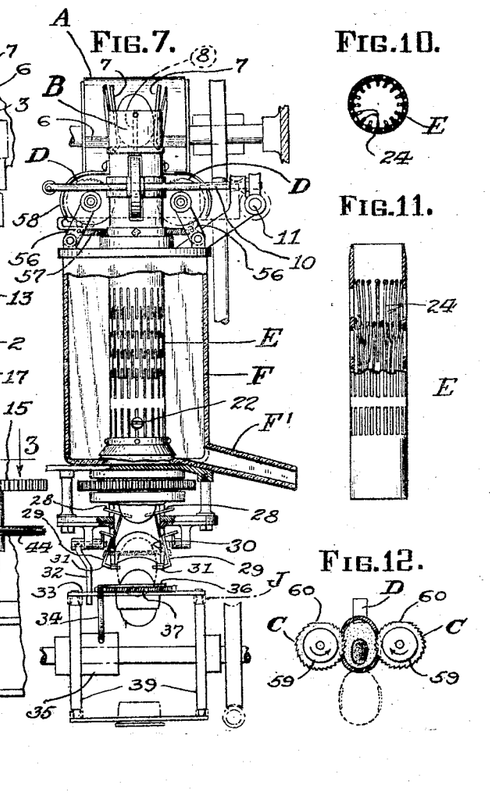
Fig. 7 is an elevation of the machine looking in the direction of arrow 7, Fig. 6.
Figs. 10 and 11 are respectively horizontal and vertical sections of a modified form of rotor.
Fig. 12 is a detail illustrating the initial aperturing of the egg shell.

The shafts of the saws are supported on rocker arms 56 with a spring 57 to draw them together against the separating tendency of the egg passing between them. Suitable guards 58 protect the saw edges, and as shown in Fig. 12, a shroud 59 on each saw, of greater thickness than the saw disc, limits the distance of penetration of the saw into the shell. The saw teeth are interrupted as at 60 in order that the action shall assure the initial bite into the very hard outer surface of the shell, and this arrangement of teeth is also used in the decapitating saw. The shafts of the feed control rollers are also yieldingly supported to move in another plane with a suitable spring, as shown, to draw them together but permit the slight yielding necessary to accommodate eggs of different sizes and shape, without subjecting the egg shells to a pressure beyond that of the light spring as suitably predetermined.

The feed tube 9 with the controlling rollers and saws are supported on base 16 which forms a cover for the jar F, and has a sliding support on the member 17 of the standard of the machine. The entire mechanism above the jar may thus be lifted up, after the hopper walls have been swung up as shown dotted in Fig. 1, carrying with it the upper bearings 18 of the rotor E, thereby permitting free access to the jar F and permitting the lifting of the rotor E to separate it at the bayonet joint 19 at the bottom from the driving base 20, so as to permit the entire removal of jar and rotor from the machine.

The rotor as shown in Fig. 6 has three longitudinal resilient members 21 secured near its top with adjusting means 22 therefor at the bottom of the rotor, so as to regulate the holding tension of the springs for the eggs passing through. A modified arrangement of egg holding means is shown in Fig. 9 where the band strips 23 are shorter and in staggered relation to facilitate the passage and holding of eggs of different sizes. Another modification of the rotor interior is shown in Figs. 10 and 11 where suitable metal bristles 24 are provided for the proper control of the egg movement. The rotor and associated elements provide for the centralizing of the eggs with their long axes substantially coincident with the axis of the rotor and their support in substantially vertical position, whereby part of the function of the method and apparatus lends itself to coacting with gravity.

By means of clutch collar 25, Fig. 6, gear 14 may be thrown into mesh with main driving gear 15 and the rotor drive gear 26, driving the rotor base 20 independently of the trap support 27 into which the egg after the rotating step, drops for synchronized delivery to cup H. This trap comprises double action fingers top and bottom, the upper fingers 28 being actuated as the rocker 29 pivots at 30 thereby simultaneously advancing or retracting the lower fingers 31. These rockers are actuated by the rocker arm 32 adapted to engage the cross members 33 associated with the cups H on the conveyor J. A trip arm 34 is synchronously operated with the trap by engaging a projection 35 which opens a shell clamp 36 on the periphery of the cup ring 37. The lower fingers of the trap are normally in a position to receive the lower-most egg dropping from the rotor cylinder, and the moment the lower fingers are tripped open to release the egg the upper fingers approach each other to catch the next egg and stop movement of the column of eggs momentarily, but when the dropped egg is carried away by the conveyor, the release of the rocker arm 32 permits the egg superposed on the upper fingers to drop into engagement with the contracted lower fingers in position to register with the next cup.

The conveyor J comprises chains driven by sprockets 39 actuated by gears and shaft 40 from the main shaft 2, the arrangement being such that the cups are actuated in synchronism with the controlling rollers C below the hopper, while the automatic trips synchronize the trap actuation with the movement of the cups.

The egg received by cup H is moved into contact with the decapitator K comprising the saw 41 driven by shaft 42 and high speed belt 43 indirectly driven by the pulley 44 on the main shaft 2. A collar 45 on the saw shaft is engaged by a controlling arm 46 having a regulating feeler 47 slightly in advance of the point of engagement of the saw with the approaching egg, so that the top of the egg shell engages the inclined under surface of the feeler 47, forcing it upward to accommodate the exact height of the egg and thereby position the saw precisely with relation to the top of the egg in order to cut a predetermined size of segment. The shaft 42 being floating to a limited extent, has its upper end gently pressed by spring 48, subject to suitable adjustment to permit ample range of movement and insure easy riding of the feeler across the top of the shell. When the feeler has located the saw in its proper plane of severance, the predetermined segment of the shell is quickly removed, and with the sag of the cup support or any other suitable means, the relation of the saw to each egg is properly preserved without difficulty from the time of incision to completion of the passage of the saw over the egg. The slight vertical movement of the saw shaft and feeler may be suitably dampened so that this, with the inertia, prevents too rapid action by spring 48. The saw surface may be inclined to decapitate and clear itself of the major portion of the egg shell as it progresses with the conveyor.

As each cup reaches the position 50, it turns with the conveyor, upending the shell and as in position 51 spills the contents into the vessel N. When the albumen has been removed in the rotor E, only the yolk is deposited into the vessel N. The empty shell then progresses to the position 52 where a roller or suitable trip 53 automatically opens the shell clamp 36 on the periphery of the cup rim and expels the inverted empty egg shell into a convenient container O.

Figures 1, 1A:
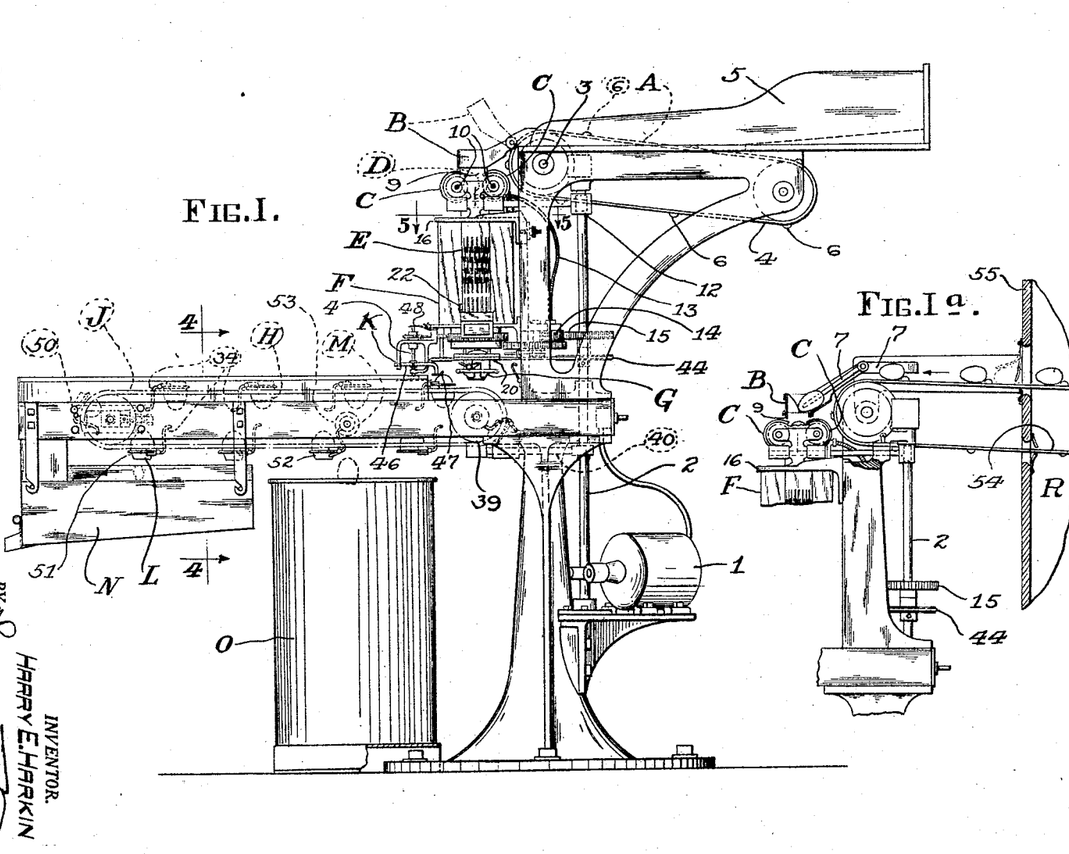
Figure 2:
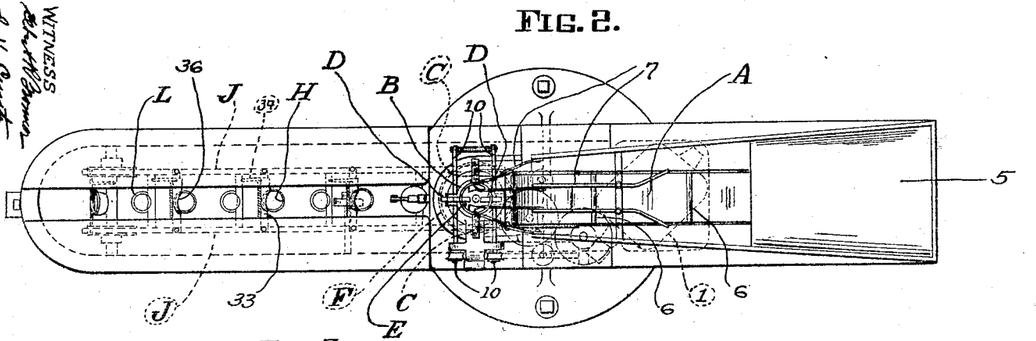
Fig. 2 is a plan view of the machine.

In the efficient handling of eggs where this method and apparatus may be used, the eggs are first "candled"—that is, tested for freshness, and for efficient operation the candlers may deposit the eggs on a conveyor 54 (Fig. 1ª) passing from the dark room R and through a wall 55 with suitable light screens, so that without further manipulation, mechanical or hand, they reach guide 7 and pass into hopper B.

Figures 13, 14:
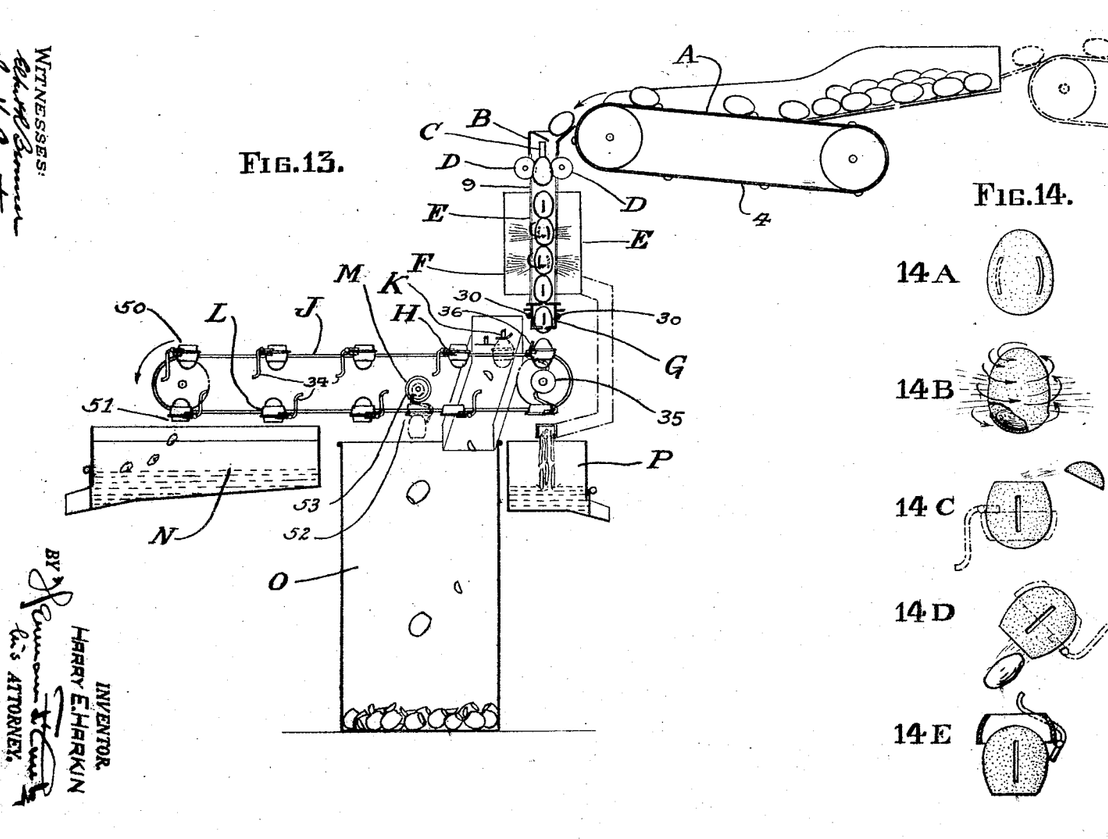
Fig. 13 is a diagrammatic illustration of the progressive steps of the method in the machine.
Fig. 14 is a diagrammatic illustration of the progressive condition of the egg in the five major steps of the method.

Referring to Fig. 14, it will be seen that the treatment of an egg consists of the step "14ª," of aperturing the egg in its equatorial zone with its major axis substantially vertical, 14ᴮ, whirling the egg on its major axis and exuding the albumen, 14ᶜ, dropping the shell with its yolk into a cup and decapitating a top segment, 14ᵈ, tipping the decapitated shell and emitting the yolk, 14ᵉ, releasing the shell from its holder and depositing the shell.

In Fig. 13 the continuous sequence of operations is diagrammatically illustrated. Eggs in any quantity are supplied to the receiving bin 5, conveyor belt 4 carries them into a guide by which they fall end-on by gravity into the hopper B, and are engaged by the controlling rollers C, which steady the egg while the saws are acting thereon. The lateral aperturing occurs while the successive eggs are suitably positioned in synchronism with the dropping of an egg from the bottom of the rotor into the conveyor. This is accomplished by the trap G releasing the egg dropped into cup H and momentarily thereafter receiving another egg in the trap, thereby letting the column of eggs drop the distance of one egg, thus providing the space at the top to accommodate the approaching egg from the aperturing mechanism. The rotor E being a cage or slotted construction as shown in the other figures, permits the exuding of the albumen as soon as the rotor speed has been transmitted to the egg, engaging it with the spring guides, so that the albumen is thrown out to the walls of the jar or vessel F. Revolving the rotor at a speed in the order of 1100 revolutions, ejects the albumen of a normal egg practically complete, and at the same time does not disrupt the yolk. The physical properties of the albumen and its contact with the shell and the edge of the aperture impart to it a centrifugal force, and to an extent the regular air space at the end of a normal egg, cooperate to facilitate a ready flow of the albumen, and the portion radially projected draws the balance of the albumen completely from around the yolk, permitting the yolk to settle to the bottom or lower end of the shell, and consequently in a position unaffected by the whirl before any appreciable rotative effect has been imparted to the axially freely supported yolk in its inertia of rest. The egg entering the top of the rotor gains a whirl progressively after engagement with the interior lateral springs, and at a point in the rise of speed the albumen being close to the apertures passes out, and, with the increased speed, the balance of the albumen is centrifugally projected by its tenacity, incidentally allowing the centrally positioned yolk to settle to the bottom substantially unaffected by the centrifugal force within the limits of most effective albumen expulsion. The decapitation follows the deposit of the egg into the conveyor cup, and running around the turn of the conveyor path automatically pours out the remaining content of the shell and upon further motion reaches the point of ejection from the machine of the completely emptied shell. The small shell segments decapitated are thrown by the saw action in uniform direction and may be readily collected by a shoot for deposit with the other portion of the empty shells. The removed albumen passes from the jar, preferably of glass, with an ample exit spout, and may be guided into receivers or cans for any desired disposition.

As many of the advantages, particularly the absence of hand manipulation, the sanitary feature and the high speed of operation is most advantageously applicable, even in the case where the whites and yolks, usually referred to as "mixed egg values," are to be removed together, this machine lends itself equally thereto. For this purpose the gear driving the rotor is shifted, which simultaneously stops the rotation of the aperturing saws, but still allows the coordinated functioning of the trap to position eggs on the conveyor for the decapitating operation with efficiency and speed, after which they pass over the return path of the conveyor, are inverted and both yolk and white spilled out of the shells together, this decapitation being regulated as to the size of the top segment, opens the egg without spilling the contents because of the normal air space at the top of the egg.

The machine operates continuously with perfect functioning at the rate of approximately one egg per second for either the complete separation of egg values or the automatic opening of the eggs. Features of the invention may be embodied in varying design of construction, and smaller and larger machines may be made embodying one or all of the elements of invention. The speed of operation may be increased to some extent, and in the same apparatus certain parts may be duplicated to multiply the capacity of a single machine.

The machine may also be hand operated but the treatment of the eggs would be mechanical and automatic.

Egg products are hereby uniformly derived with a minimum bacterial content which is vastly below the bacterial count in hand-opened egg products. It makes possible separation of yolks with an albumen content of less than 5 percent whereas, universally in the trade today, other means of separation can assure nothing better than 15 or 20 percent albumen content.

It will thus be seen that this invention involves methods for the practical and economical separation of the contents of eggs from their shells by machinery and by automatic operations performed by the machinery without the handling by hand or by any hand apparatus or devices, and the specific machine illustrated and described is one embodiment of the invention which accomplishes the desired results without touching the egg shell or without hand contact with any of the contents of the shell separated and carried to utensils or vessels for preservation or transportation. Even though the complete egg is placed by hand on a conveyor, the contents is automatically removed and dissociated from the shell without coming in contact with the outside of the shell. The result makes possible machine operation in this industry of egg opening which is a large proportion of the egg business of the world and particularly in the countries of large egg production and supply and transportation to the concentrated egg-eating populations of the world. It makes possible the elimination of contamination by hand contact with the egg contents, in heretofore universally practiced method of hand opening of eggs, so that large sources of egg material supply may be safetly brought to distant market without being injuriously infected with bacteria.

The method may be varied in many ways without departing from the spirit of this invention, while some of the steps in the method may be used without all of the steps shown in the particular embodiment herein described, as, for example, suitable feed which permits high speed of operation and can supply eggs mechanically and automatically for the opening of the shell and the delivery mechanically of the contents with continuous progressive operations, and at a high speed and great efficiency in the separation. Simplifications in the method may be made with the knowledge of this invention, and for special purposes special machines having only part of the steps of the method may be utilized within the purview of this invention.

The apparatus or the machine, it will be noted, also lends itself to perfect sanitary handling of the material when separated by the machine. As, for example, the vessels surrounding the rotor may be made of glass or other most cleanly material, and the construction of the machine permits the periodic removal of the jar and its inspection and cleaning, while the rotor parts with which the albumen contacts in the process of extraction, may be readily removed at will, for inspection or for periodic cleaning. The arrangement of parts permits the protection of the egg matter during the operation of the machine and the protection of the egg products delivered from the machine to avoid any contamination. As shown, when complete separation of white from yolk is in progress, the arrangement carries the shells with the separated yolk in a path accessible for the detection of bad yolks in time to permit removal in such cases before such bad yolk can reach the other collected yolks.

The mechanism accommodates eggs of various sizes as shown in the construction of the guides to the hopper and feed tube and rotor, as well as the means for nesting the egg in a suitable conveyor for the final separation of contents from the shell. In this respect the synchronized control of the egg moving by the aperturing devices, supplies eggs progressively at one end of the column, with removal at the other end, while still assuring the suitable time element for each egg to remain subjected to the white exuding operation, when complete separation is performed, with due regard to the time required for complete expulsion of the white without injury to the yolk. It also provides for a suitable progressive movement of a series of eggs in a way lending itself to high speed of functioning throughout the course of the method. The yielding of the axes of the control roller and the saws for aperturing accommodate without interruption or delay the different sizes of eggs and the different shapes of eggs, while the release for synchronized nesting with the means for ultimate delivery functions in a manner preventing any objectionable jar to any of the eggs in process, with certainty of functioning due to gravity, in the form of machine shown, or with any other progressive movement which might be used in harmony with the method set forth herein.

While in some respects egg shells are fragile, the methods and apparatus provide for continuous movement with every step readily accommodating the conditions which avoid breakage and prevent opening of the egg shell except as predetermined, with the slight interrupted movement in such parts as shown, of a character whereby the high speed of operation constitutes substantially continuous motion.

Machines made in accordance herewith will have a suitable base for support and rigidity and the shafting having suitable anti-friction bearings when required to perform their functions as shown through the interposition of worm or helical gears, pinions or bevel gears of suitable ratios. While the driving of the control rollers is illustrated as by helical gear, the provision for the lifting of the rotor jar cover is accommodated by the rolling of the inter-meshing gears, but flexible or jointed shafting may be there employed. As shown belts drive the aperturing saws and the shell-opening saw actuated by a pulley on the main shaft, but the speed of these saws does not have to synchronize with the speed of other parts of the mechanism, so that they may be driven in any desired manner and their diameter may be varied somewhat, though perfect results have been obtained with saws about three inches in diameter turning in the order of four thousand revolutions, while half this speed has also been effective. With the eggs securely held in the conveyor, after leaving the trap, convenience for counting the performance of the machine is accomplished by placing the trip arm of the automatic counter in the path of the egg shell, thus assuring the accurate count of only eggs actually handled or opened.

The rotor speed is effective for practically perfect extraction of the albumen at about 1100 revolutions, and without any practical effect upon the yolk when the movement of eggs through the machine is at a rate of from fifty to sixty a minute. The acceleration of the egg when dropped into the rotor involves a time element and depends upon the contacting of the centering springs, and on that account due regard is given to either the adjustment of full length springs or a series of shorter staggered springs in order to get the best results when eggs of the usual variation in sizes are handled.

It will be realized that all of the parts of the machine are readily accessible for inspection, adjustment or repair. In particular, all parts that come in contact with egg matter are subject to complete protection from a sanitary standpoint, ready cleansing, and the final delivery of the egg contents may be assured without any chance of contamination.

In various parts modifications may be made in design and material or construction without departing from the invention. Various combinations of the different steps of the method may be made or the method abbreviated or expanded, and many changes may be made in construction of the apparatus, when the inventions herein set forth have become known and those familiar with machinery and egg handling have become skilled in the art, without departing from what I claim and desire to secure by Letters Patent, which is:

1. A method of separating the contents of eggs from the shell, comprising the positioning of an egg with its axis vertical, forming an aperture in the side of the egg, passing the egg into an upright receiver, spinning the egg and expelling the albumen, and automatically controlling the removal of the egg from the spinning container.

2. A method of separating the contents of eggs from their shells, comprising the progressive movement of a series of eggs in a common axial direction, intermittently retarding the advance egg, thereafter nesting said egg in a juxtaposed receiver moving through a registered position in relation thereto, and momentarily holding the following egg, thereafter conveying the nested egg in operative relation with means for opening the same, and discharging the contents.

3. A step in a method of handling eggs, comprising progressively passing a series of eggs in line, automatically interrupting the movement of the foremost egg in the column and intermittently dropping the foremost egg and interrupting the movement of the next following, thereafter dropping the interrupted egg into the held position, and successively supplying eggs to the position for intermittent motion and thereafter carrying the eggs away for the further step of handling.

4. A step in a method of handling eggs, comprising the supply of a series of eggs to a guide adapted to hold end on a plurality of eggs, moving said eggs to an outlet at the lower end and intermittently interrupting the fall of the foremost egg and thereafter simultaneously dropping the foremost egg while interrupting the movement of the following egg.

5. An apparatus for handling eggs automatically, comprising means for carrying the eggs to the top of a hopper, means for passing the eggs with a common axis substantially upright into a container supporting them end on, means for retaining a plurality of eggs in the passage through the container subject to the influence of force to extract the albumen, means for trapping the bottommost egg in the column and intermittently delivering the foremost egg to a moving conveyor, means for opening the egg shell in conjunction with the operation of the conveyor, and means for thereafter discharging the remaining contents of the shell.

6. An apparatus for separating the contents of eggs from the shell, comprising means for delivering eggs successively into a rotor, means for whirling the eggs to discharge the albumen, a conveyor moving past the outlet from the rotor and means for synchronizing the discharge of each egg from the rotor with engagement of an egg nesting means on the conveyor.

7. An apparatus for handling eggs, comprising means for the delivery of eggs end to end to a cylindrical guide, means for controlling the individual egg delivery to the guide and means for intermittent releasing of each egg from the exit of the guide for delivery to a juxtaposed moving conveyor.

8. In apparatus for handling eggs, means for passing a series of eggs end to end into a substantially cylindrical guide yieldingly supporting each of the series of eggs separately to accommodate varying sizes of eggs within the guide, and permitting passing the eggs progressively through said guide, means for intermittently interrupting the movement of the column of eggs synchronously with a timed discharge of the foremost egg.

9. In an apparatus for handling eggs, means to provide the passage of a series of eggs into a substantially cylindrical container with their common axis generally in alignment, means for regulating the supply to the cylinder in synchronism with the discharge from the cylinder at the opposite end.

10. In an apparatus for handling eggs, means to supply a plurality of eggs to one end of a substantially cylindrical guide adapted to permit movement in a common axial direction, means intermittently controlling the exit of each egg, means controlling the inlet to the guide by movement of successive eggs through the inlet after each intermittent discharge of an egg provides a predetermined space in the guide for the in-coming egg.

11. Apparatus for carrying out the method hereinbefore claimed in which a column of eggs, having their long axes vertical, is formed and maintained by mechanisms, having means to continuously remove the lowermost egg of the column for decapitation and means to add an egg to the upper end of the column to continue and maintain the supply for decapitation.

12. Apparatus for the purpose described, comprising saws, mechanism adapted to guide an egg to a position with its long axis substantially vertical for lateral aperturing of the shell by said saws or the like and an elongated member for receiving said apertured shell and rotating same on its long axis to separate and collect one of the egg constituents.

13. Apparatus for the purpose described in which a column of eggs having their long axis vertical is formed and maintained, having means adapted respectively to continuously remove the lowermost egg of the column and means to add an egg to the upper end of the column to continue and maintain the supply for later opening of the eggs.

14. Apparatus for the purpose described in which a column of eggs is formed having their long axes in alignment, mechanism adapted to maintain them in alignment and respectively to continuously remove the foremost egg of the column, means for thereafter decapitating each egg, and means for adding an egg to the beginning of the column intermittently, to continue and maintain the supply for decapitation.

15. An apparatus for removing the contents from the shells of eggs, comprising a rotatable tubular member adapted to contain a gravitating column of eggs, synchronously operated mechanism adapted to reduce and replenish said column, a device for opening each egg after its removal from the column and means for supporting part of the shell and thereafter tilting the same and discharging the contents from the shell.

16. Apparatus for the purpose described, comprising a rotor adapted to receive a plurality of eggs successively and to rotate the same to remove the albumen, means to evacuate the shells from the rotor and mechanism for opening the shell and thereafter spilling the yolks therefrom.

17. In an automatic apparatus for separating the contents of eggs from their shell, means for mechanically manipulating the eggs, to move each egg successively into a confined position with its long axis vertical and means for then laterally aperturing each shell.

18. An apparatus for separating the contents from the shells of eggs, comprising mechanism for conveying and controlling the movement of each egg to a position with its long axis substantially vertical and means for then laterally slotting the shell.

19. In an apparatus for separating the contents of eggs from their shells, saw means for aperturing the shell, and means for automatically bringing successive eggs in predetermined engagement with the saws.

20. Apparatus for separating contained egg values from an apertured shell, comprising means for spinning the shell to discharge certain of the contained egg values through the apertured shell by centrifugal force.

21. Apparatus for separating contained egg values from a laterally apertured shell, comprising means for spinning the egg on its long axis to discharge certain of the contained egg values through the apertured shell by centrifugal force.

22. Apparatus for separating contained egg values from the shell, which comprises means for laterally aperturing the shell, and means for spinning the egg on its long axis to discharge certain of the contained egg values through the apertured shell by centrifugal force.

23. Apparatus for separating contained egg values from the shell, which comprises a rotor adapted to receive and engage the shell, and means for driving said rotor at a speed sufficient to discharge certain of the contained values of the egg through an aperture in its shell by centrifugal force.

24. Apparatus for separating contained egg values from the shell, comprising an open-ended rotor, through which an egg may be passed, and in which it is engaged, and means for driving said rotor at a speed sufficient to discharge certain of the contained values of the egg through an aperture in its shell by centrifugal force.

25. Apparatus for separating contained egg values from the shell, which comprises a rotor adapted to receive and engage the shell, and means for driving said rotor at a speed sufficient to discharge certain of the combined values of the egg through an aperture in its shell by centrifugal force, said rotor having openings through which the discharged egg values may escape.

26. Apparatus for separating contained egg values from the shell, which comprises a rotor adapted to receive and engage the shell, and means for driving said rotor at a speed sufficient to discharge certain of the contained values of the egg through an aperture in its shell by centrifugal force, said rotor having openings through which the discharged egg values may escape, together with a container surrounding said rotor.

27. Apparatus for separating contained egg values from the shell, which comprises a conveyor, means on the conveyor to receive and grip an egg, with its long axis substantially at right angles to the conveyor, decapitating means to which the egg is fed while gripped on the conveyor, and means for inverting the egg while gripped on the conveyor to discharge the shell contents.

28. Apparatus for separating contained egg values from the shell, which comprises a conveyor, means on the conveyor to receive and grip an egg, with its long axis substantially at right angles to the conveyor, a rotary saw into the path of which the head of the egg is moved while gripped on the conveyor, and means for inverting the decapitated egg while gripped on the conveyor to discharge the shell contents.

29. Apparatus for separating contained egg values from the shell, which comprises a conveyor, means on the conveyor to receive and grip an egg, with its long axis substantially at right angles to the conveyor, decapitating means to which the egg is fed while gripped on the conveyor, and means for inverting the egg while gripped on the conveyor to discharge the shell contents, together with means for discarding the emptied shell at a point removed from the point of discharge of its contained values.

30. Apparatus for separating contained egg values from the shell, which comprises means supporting the egg with its long axis vertical, means for forcibly discharging the albuminous matter horizontally from the shell, and means for thereafter discharging the yolk by gravity.

31. Apparatus for separating contained egg values from the shell, which comprises means for discharging the albuminous matter from the shell by centrifugal force, and means for thereafter discharging the yolk from the shell.

32. Apparatus for separating contained egg values from the shell, which comprises means for supporting the egg with its long axis vertical, means for forcibly discharging the albuminous matter from the shell, and means for thereafter discharging the yolk by gravity, together with means for discarding the emptied shell at a point removed from the point of discharge of its contained values.

33. Apparatus for separating contained egg values from the shell, which comprises a conveyor, associated means spaced along its length for gripping eggs, and means for intermittently feeding to the gripper devices, together with means for decapitating an end of each of the egg shells while they are carried by said conveyor.

34. Apparatus for separating contained egg values from the shell, which comprises a rotor for spinning the egg, a conveyor having spaced gripping devices for receiving the egg from the rotor, and means for intermittently discharging the eggs from the rotor to the conveyor.

35. Apparatus for separating contained egg values from the shell, comprising a rotor through which the egg passes and by which it is spun, means for supporting the egg at the discharge end of the rotor, and a conveyor having spaced gripping means adapted to be intermittently presented in register with the discharge end of the rotor to receive an egg therefrom.

36. Apparatus for separating the contents of eggs from their shells, comprising a feed control, a rotor to receive the same therefrom, a trap at the exit end of the rotor and conveyor means moving in juxtaposition to said trap.

37. Apparatus for handling eggs, comprising a tubular guide, means controlling individual eggs approaching the inlet to said guide and a trap controlling the exit of eggs from the discharge of the tube.

38. An apparatus for handling eggs, comprising a tubular guide adapted to contain a plurality of eggs in progressive motion, a trap controlling the exit of the eggs from the guide, means in said trap for intermittently holding the foremost egg and simultaneously retarding the following egg with the discharge of the foremost.

39. Apparatus for the purpose described, having means for successively supplying eggs and rotating them on their major axis, a vessel surrounding the eggs during the period of rotation and an outlet from the vessel for continuous removal of the material ejected from the eggs during their rotation.

40. In an apparatus for the purpose described, means for aperturing successive eggs, a rotor, a container surrounding said rotor, a shiftable top support for the rotor and container and means for securing the same in operating position, and means for readily detaching the same and permitting the entire removal of the container.

41. A self-contained apparatus for handling eggs, comprising a standard, a motor, means for spinning eggs and means for automatically conveying the eggs away from the spinning means and a common drive shaft from the motor for synchronously driving the spinning and conveying means.

42. A self-contained apparatus including means for spinning eggs, means for aperturing the eggs laterally, means for conveying the eggs away from the discharge of the spinning means and means for opening the shells, a source of power and shafting therefrom self-contained by said apparatus and inter-related gearing to synchronously guide the several means for the purpose described.

43. An apparatus for handling eggs, comprising means to hold an egg, a decapitating device and means for regulating the decapitating device with respect to the end of the egg in cooperation with automatic movement of the egg with relation to the decapitation.

44. An apparatus for handling eggs including means for holding a series of eggs, and moving them in a predetermined path, a saw adapted to engage and sever one end of the egg shell and a feeler adapted to engage the end of the shell and predetermine the relative position of the saw with respect to the shell end.

45. In an apparatus for opening eggs, automatic means for bringing a series of eggs successively into engagement with a shell-severing device and means cooperating between the device and the shell to determine the size of the section of shell to be severed.

46. In an apparatus for opening eggs, automatic means for moving eggs in series into a vertical position, means for holding them and laterally aperturing the shell above the bottom, means for transferring each egg into a vertical holder and means for spinning the holder to horizontally discharge the albumen through the apertures, and means for automatically removing the shell from the holder.

Signed at New York, this 13th day of December 1922.

HARRY E. HARKIN.